US005517382A

United States Patent [19]

Leupp et al.

[11] Patent Number: 5,517,382

[45] Date of Patent: May 14, 1996

[54] SURGE SUPPRESSOR HAVING LOOPED CLAMPING ELEMENTS

[75] Inventors: Peter Leupp, Thalwil, Switzerland; Bertil Moritz, Västeras, Sweden; Walter Schmidt, Bellikon, Switzerland

[73] Assignee: ABB Management AG, Baden, Switzerland

[21] Appl. No.: 205,803

[22] Filed: Mar. 4, 1994

[30] Foreign Application Priority Data

Mar. 4, 1993 [DE] Germany .......................... 43 06 691.7

[51] Int. Cl.[6] .............................. H01C 7/112; H02H 1/04

[52] U.S. Cl. ............................ 361/118; 361/127; 361/117

[58] Field of Search .................................... 361/117, 126, 361/127, 56, 131–132, 111–112, 118; 332/28

[56] References Cited

U.S. PATENT DOCUMENTS

| | | | |
|---|---|---|---|
| 4,812,944 | 3/1989 | Eberhard et al. | 361/127 |
| 5,291,366 | 3/1994 | Giese et al. | 361/117 X |

FOREIGN PATENT DOCUMENTS

| | | |
|---|---|---|
| 0230103 | 7/1987 | European Pat. Off. . |
| 0230103A3 | 11/1987 | European Pat. Off. . |
| 0335479A2 | 10/1989 | European Pat. Off. . |
| 0445054A1 | 9/1991 | European Pat. Off. . |
| 0335480B1 | 12/1992 | European Pat. Off. . |
| 1413906 | 10/1968 | Germany . |
| 1563738 | 6/1970 | Germany . |
| 2907985C2 | 8/1985 | Germany . |
| 3544141A1 | 6/1986 | Germany . |
| 1051645 | 10/1983 | U.S.S.R. . |
| 1186091 | 10/1985 | U.S.S.R. . |
| 1377926 | 2/1988 | U.S.S.R. . |
| 2229331 | 9/1990 | United Kingdom . |

OTHER PUBLICATIONS

"Forming Method for Current Limiting Element", Patents Abstracts of Japan, E–862, Dec. 18, 1989, vol. 13, No. 57, Patent No. 1–239814 (Sep. 1989).

*Primary Examiner*—A. D. Pellinen
*Assistant Examiner*—Michael J. Sherry
*Attorney, Agent, or Firm*—Burns, Doane, Swecker & Mathis

[57] ABSTRACT

The surge arrester contains two connection fittings (1, 2) which are spaced apart from one another along an axis and between which at least one cylindrical varistor element (7) is arranged. The connection fittings (1, 2) and the at least one varistor element (7) are clamped with one another, accompanied by the formation of contact force, to form a mechanically stable active part of the surge arrester. The active part is surrounded by a cast housing (12) made from insulating material. The clamping of the active part is achieved by at least two loops (5) respectively acting independently of one another on the connection fittings (1, 2). The loops (5) are arranged at a distance from the at least one varistor element (7). The connection fittings (1, 2) contain bearing areas which correspond respectively to the number of the loops (5) and are distributed uniformly about the axis azimuthally and on which a loop end is respectively supported. Despite its simple design, the surge arrester has good mechanical and electrical characteristics and can be produced in a particularly cost-effective way.

14 Claims, 3 Drawing Sheets

SURGE SUPPRESSOR HAVING LOOPED CLAMPING ELEMENTS

BACKGROUND OF THE INVENTION

1. Field of the Invention

The invention pertains to a surge arrester having looped clamping elements.

2. Discussion of Background

The invention refers in this connection to a prior art such as emerges, for example, from EP 0,335,480 B1. A surge arrester described in this prior art contains a plurality of nonlinear resistor elements with varistor behavior, which are stacked one above another and arranged between two power connection fittings. A winding led around the resistor elements and a portion of the connection fittings and made from nonçonductive material clamps the connection fittings and the resistor elements while forming a force which acts in an axial manner. This force is required to form a current path, which must conduct high currents briefly given the occurence of surge. A cast housing made from a weather-resistant plastic surrounds the resistor elements, the winding and the predominant portion of the connection fittings.

The production of such a surge arrester is expensive, since the resistor elements are accommodated in a plastic tube and since the application of the winding is, in addition, relatively complicated.

SUMMARY OF THE INVENTION

Accordingly, one object of this invention is to provide a novel surge arrester which despite a simple design has good mechanical and electrical characteristics, and which can be produced in a particularly cost-effective way.

By comparison with comparable surge arresters according to the prior art, the surge arrester according to the invention is distinguished in that despite excellent mechanical and electrical characteristics it is of simple design and therefore can be produced in a particularly economic way. All that is required for its assembly is a prefabricated template which temporarily guarantees axial guidance in which the connection fittings and the at least one varistor element are firstly stacked and thereafter connected to form the mechanically stable active part of the surge arrester by fitting the loops and forming a bias. Since in this case the loops are fitted at a distance from the at least one varistor element, during the subsequent production of the cast housing the active part can be extrusion coated very reliably in a manner free from gaps and shrink holes. The surge arrester according to-the invention therefore has not only good mechanical, but also good electrical characteristics.

The loops can already be prefabricated and then require during assembly only to be pushed onto the bearing areas of the connection fittings. Loops which are particularly stable and yet of small dimensions contain a tape which is wound in the shape of a loop and is advantageously embedded in a plastic matrix. The mechanical stability of the active part can then be achieved by subsequently clamping the elements stacked in the template during assembly, for example by means of a clamping device provided in one of the two connection fittings, or else by means of spring elements which are installed in the stack arranged in the template and are biased during fitting of the loops accompanied by the formation of the desired contact force and thus also of the required mechanical stability.

An additional clamping device or additional spring elements can be saved if the loops are formed in each case by an elastically deformable tape, for example made from glass fibers. The tape is then wound around the connection fittings with the bias prescribed by the contact force accompanied by the formation of the contact force and thus also of the mechanical stability of the active part, and herewith supported on each case one of the bearing areas of each of the two connection fittings.

The wound tape should expediently be embedded in a plastic matrix, which is formed by the curing of curable plastic after the loops have been placed on the bearing areas. The tape is advantageously impregnated with a pregelled, for example epoxy-based plastic (prepreg) which is cured after the winding executed under bias. Since such a tape has good adhesive properties, fastening devices for the tape end are eliminated when it is used.

The bearing areas on the connection fittings should preferably have a section with a semicircular surface profile of the largest possible circle diameter, since then the clamping force exerted by the tape is absorbed particularly uniformly by the connection fittings and is transmitted as a homogeneously acting contact force to the at least one varistor element. The bearing areas can be arranged on projections or in recesses of the connection fittings which are constructed as shoulder and as groove, respectively. The construction as groove is particularly advantageous in this case, since a groove can be shaped without difficulty in a conventionally employed, cylindrical connection fitting and simultaneously guarantees a particularly secure support for the assigned loop.

Two bearing areas arranged diametrically relative to one another and on which one of two loops is respectively supported generally suffice on each connection fitting for good mechanical stability of the active part. Additional stability is achieved by using three bearing areas, arranged offset azimuthally about the axis by approximately 120°, on which one of three possibly further improved slightly by four or more bearing areas per connection fitting, but this does not cause additional outlay on production.

It is expedient to provide at least one current transfer element which can be deformed with the formation of the contact force in the current path between the connection fittings. This guarantees particularly reliable contacting and thus a good current carrying capacity of the current transfer between two varistor elements or the connection fitting and a varistor element or a pressure plate possibly provided in the current path. It has proved to be very favorable for the current transfer element to be constructed as a disk and to have grooves which are guided concentrically about the axis and shaped in end faces of the disk. A current transfer element constructed in this way specifically seals the current transfer zones in the active part against the penetration of liquid insulating material during casting of the housing of the surge arrester.

Preferred exemplary embodiments of the invention and the further advantages which can be achieved therewith are explained in more detail below with the aid of drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein the exemplary embodiments of the invention are represented in a simplified way and.

DESCRIPTION OF THE PREFERRED EMBODIMENTS

Figure 1:
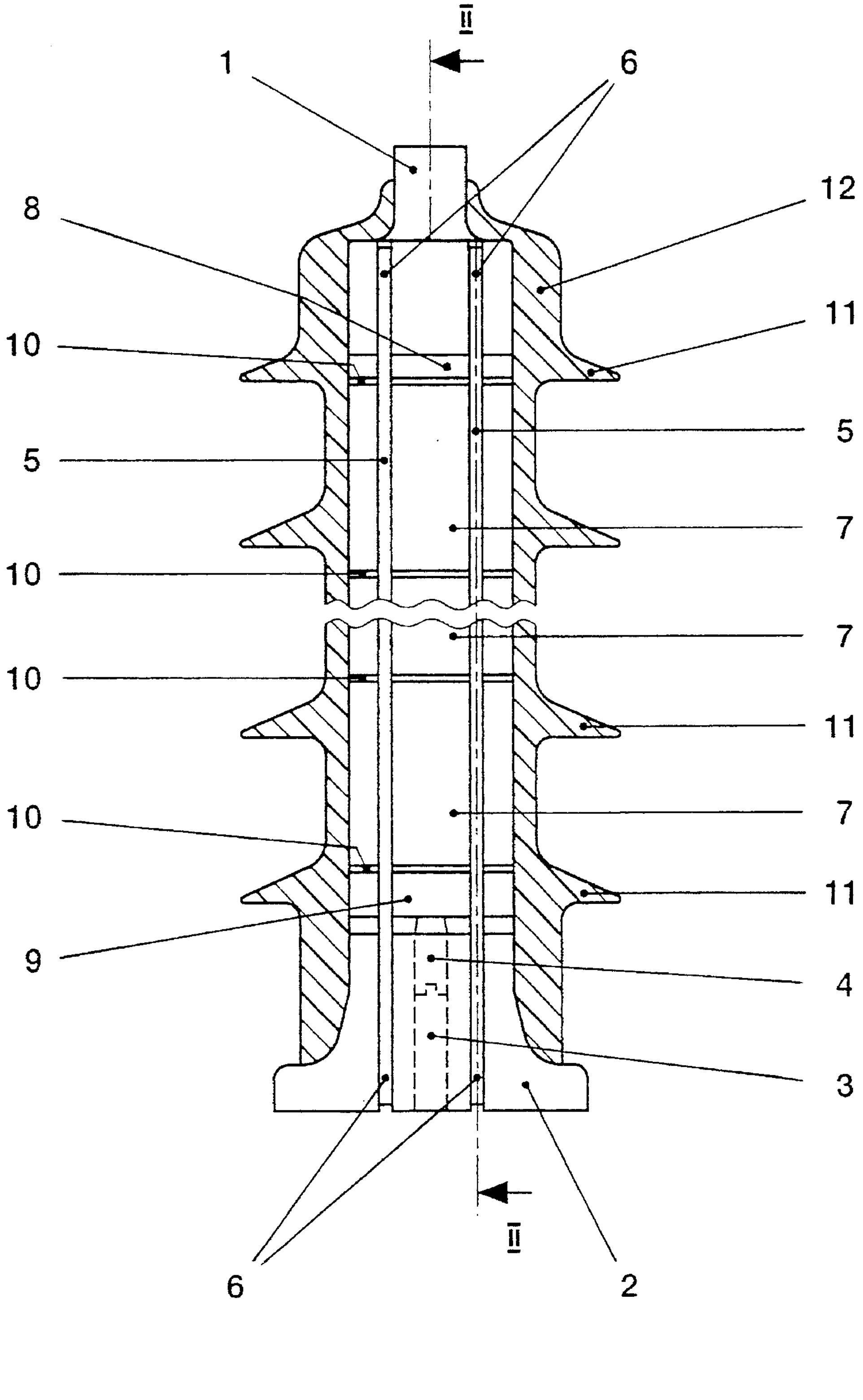
FIG. 1 shows a side view of a first embodiment of the surge arrester according to the invention, in which the part of the cast housing facing the viewer is removed.
Figure 2:
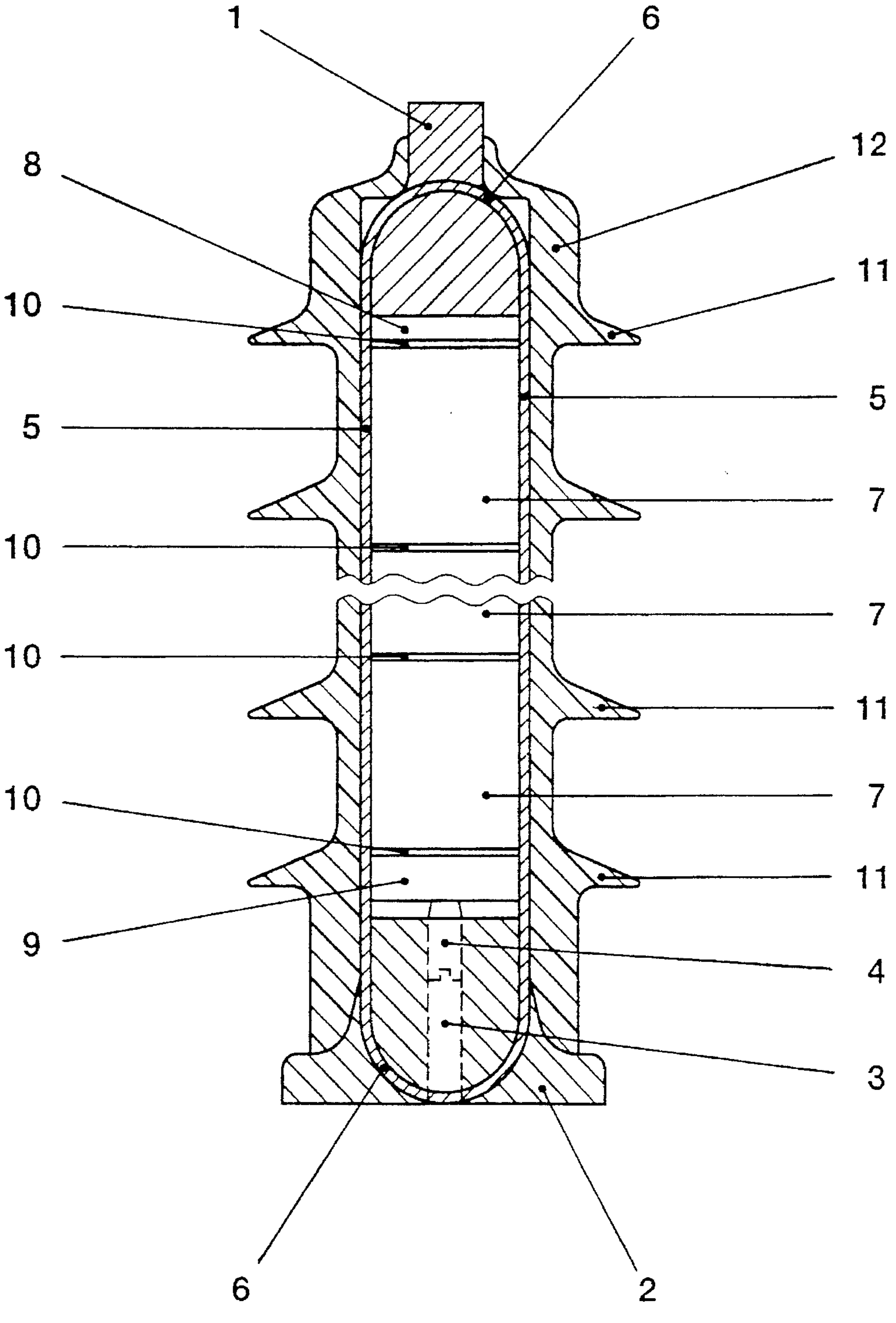
FIG. 2 shows a view of a section conducted along II—II through the embodiment of the surge arrester in accordance with FIG. 1.
Figure 3:
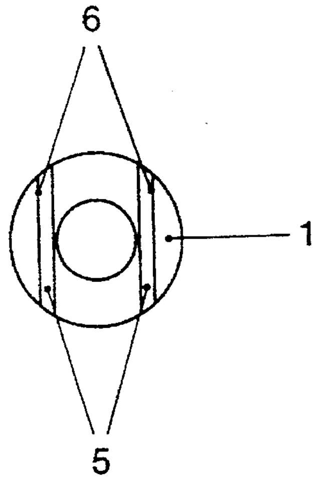
FIG. 3 shows a top view of a connection fitting of the embodiment, represented in FIG. 1, of the surge arrester according to the invention.

Referring now to the drawings, wherein like reference numerals designate identical or corresponding parts throughout the several views, the essentially cylindrically symmetrically constructed surge arrester represented in FIGS. 1 to 3 has two connection fittings 1, 2 which preferably consist of aluminum and are spaced apart from one another along the cylinder axis. The connection fitting 1 is provided with a fastening device (not represented) for an electric conductor. Provided in the ground connection fitting 2 is an axially aligned threaded bore 3 in which a clamping bolt 4 can be displaceably guided in the axial direction. 5 denotes two loops made from a wound, glass fiber reinforced tape embedded in a plastic matrix. The loops are guided with their ends in grooves 6 which are shaped into the connection fittings 1 and 2. The grooves 6 respectively form in the base of the groove bearing areas with a section having a semicircular surface profile which are adjoined respectively by two axially extending sections (FIG. 2).

Cylindrical varistor elements 7 made from nonlinear resistance material, for example based on metal oxide such as, in particular, ZnO are arranged between the connection fittings 1, 2. A disk-shaped pressure plate 8 made from aluminum is inserted in a cutout of the connection fittings 1. Arranged between this plate and the adjacent varistor element 7, between adjacent varistor elements 7 and between a further pressure plate 9 made from aluminum and a further varistor element 7 are current transfer elements which are respectively constructed as disk 10 having grooves which are guided concentrically about the axis and shaped in the two end faces of the disk. The disks 10 are advantageously formed from soft-annealed aluminum.

The connection fittings 1, 2 are partly surrounded, and the varistor elements 7, the pressure plates 8, 9 and the loops 5 are completely surrounded by a cast housing 12 provided with shields 11 and made from insulating material.

In order to produce this surge arrester, the connection fitting 2 and the pressure plate 9 are sequentially, and the disks 10 and the varistor elements 7, the pressure plate 8 and the connection fitting 1 are alternately packed one above another in a template. The grooves 6 of the two connection fittings 1, 2 are aligned in this case such that they are flush with one another (FIG. 1). Two prefabricated loops 5, which preferably respectively consist of a wound, tapeshaped prepreg which has been cured after winding, are then suspended in the mutually flush grooves 6, and by turning the clamping bolt 4 force is exerted on the pressure plate 9 and thus, via the self-clamping loops 5, also on all the remaining parts of the active part of the arrester.

Instead of two prefabricated loops, it is also possible to use two loops which are formed during the production of the surge arrester. In order to form these loops, two tapes to which a biasing force is respectively applied are wound around the two connection fittings 1, 2 and laid down on the bearing areas of the two flush grooves 6. In this case, the two connection fittings 1, 2 are permanently clamped to one another accompanied by the formation of contact force, and a mechanically stable active part of the surge arrester to be produced is thereby formed. This biasing is generally already completely adequate for a good mechanical strength of the active part of the arrester. In the case of the use of tapes of adequate elasticity such as is already possessed, for example, by tapes made from glass fibers, the active part of the arrester can therefore consist only of the two connection fittings 1, 2, the at least one varistor element 7 and the loops 5.

These tapes are preferably prepregs, in particular based on glass fibers and epoxy. Prepregs have a good adhesion effect. Loops wound from the biased prepregs are therefore stable after being wound even without an additional fastening device, and can now be cured at raised temperatures. The loops 5, which effect the contact force and thus also the mechanical stability of the active part and which consist of the wound tape and a cured plastic matrix which embeds the tape are now formed in the process.

In addition to a good contacting of the individual parts located in the current path between the two connection fittings, by virtue of the clamping of the two connection fittings 1, 2 the use of the disks 10 simultaneously also achieves a close fit of the grooves of the disks 10 with the end faces of the varistor elements 7 and of the connection fittings 1, 2 as well as of the pressure plates 8, 9 possibly provided. During subsequent extrusion coating of the active part of the arrester by means of insulating material, preferably based on silicone, the penetration of liquid insulating material between the parts located individually in the current path is thus largely avoided. In accordance with exemplary embodiments, such as those shown FIGS. 4 and 6, the loops 5 are fitted at a distance from the varistor elements 7, such that during subsequent production of the cast housing, the active part can be extrusion coated very reliably in a manner free from gaps and shrink holes.

Figure 4:
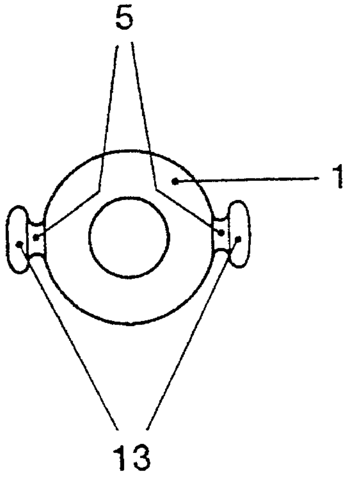
FIG. 4 shows a top view of a connection fitting of a second embodiment of the surge arrester according to the invention.

As may be seen from FIG. 4, instead of two grooves the connection fittings can also have two projections constructed as shoulders 13. Such projections can easily be shaped into the connection fittings 1, 2, and facilitate the application of the loops 5.

Figure 5:
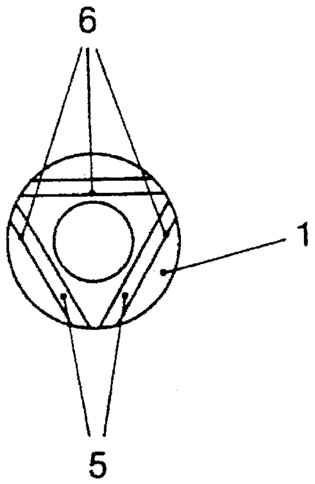
FIG. 5 shows a top view of a connection fitting of a third embodiment of the surge arrester according to the invention.
Figure 6:
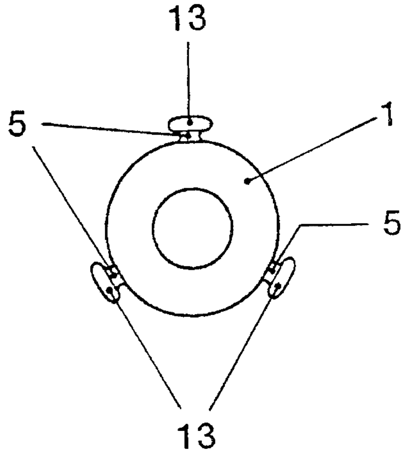
FIG. 6 shows a top view of a connection fitting of a fourth embodiment of the surge arrester according to the invention.

It may be seen from FIGS. 5 and 6 that the connection fittings can also possibly have three grooves 6 or shoulders 13 respectively arranged offset by 120°. The mechanical stability of the active parts of the arrester can be additionally increased in conjunction with prescribed contact force by the installation of such connection fittings 1, 2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A surge arrester having two connection fittings spaced apart from one another along an axis, at least one cylindrical varistor element arranged between the two connection fittings, a clamping device, made from insulating material, which clamps the connection fittings and the at least one varistor element with a contact force, and a cast housing, made from insulating material, which at least partially surrounds the connection fittings, the at least one varistor element and the clamping device, wherein the clamping device has at least two clamping elements which respectively act independently of one another on the connection fittings and are respectively constructed as loops, the connection fittings including bearing areas which are distributed about the axis in an azimuthally uniform fashion and on which a loop end is respectively supported,wherein the bearing areas respectively have a section with a semicircular surface profile.

2. The surge arrester as claimed in claim 1, wherein the bearing areas are arranged in recesses, constructed as grooves, at least on one of the two connection fittings.

3. The surge arrester as claimed in claim 1, wherein two bearing areas arranged diametrically relative to one another are provided on each of the two connection fittings.

4. The surge arrester as claimed in claim 1, wherein three bearing areas arranged offset azimuthally about the axis by approximately 120° are provided on each of the two connection fittings.

5. The surge arrester as claimed in claim 1, wherein at least one of the loops contains a wound tape.

6. The surge arrester as recited in claim 1, wherein said bearing areas are arranged in recesses formed on at least one of the two connection fittings.

7. The surge arrester as claimed in claim 1, wherein the loops are arranged at a distance from the at least one varistor element.

8. The surge arrester as claimed in claim 5, wherein the wound tape is embedded in a plastic matrix.

9. The surge arrester as claimed in claim 8, wherein the plastic matrix is formed of curable plastic which has been cured before the loops have been placed on the bearing areas.

10. The surge arrester as claimed in claim 8, wherein the plastic matrix is formed of curable plastic which has been cured after the loops have been placed on the bearing areas.

11. A surge suppressor comprising:

two connection fittings spaced from one another along an axis;

at least one cylindrical varistor element located between said two connection fittings along said axis;

a clamping device for clamping the connection fittings and the at least one varistor element together along said axis, said clamping device further including at least two independent loops supported on bearing areas of the connection fittings, said bearing areas being uniformly distributed about said axis and being formed with a semicircular surface profile; and a housing formed of insulating material which at least partially surrounds the connection fittings, the at least one varistor element and the clamping device.

12. The surge arrester as recited in claim 6, wherein at least one of said loops contains a wound tape embedded in a plastic matrix.

13. The surge arrester as recited in claim 12, wherein the plastic matrix is a curable plastic.

14. The surge suppressor as recited in claim 13, wherein each of the at least two independent loops is arranged at a distance from the at least one varistor element.

* * * * *